J. R. HAMILTON.
Insect-Destroyer.
No. 68,188.
Patented Aug. 27, 1867.
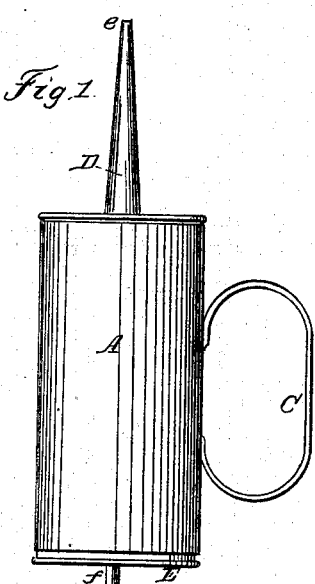
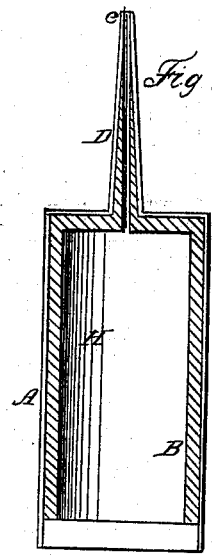
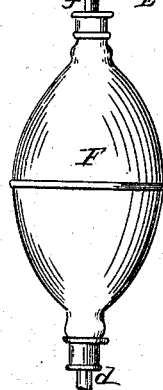
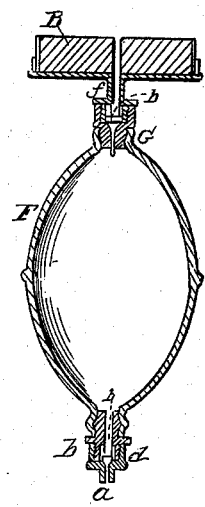
Witnesses:
Andrew Carson
E. J. Davis
Inventor:
Jonathan R Hamilton
By his Attorneys
J. B. Woodruff & Son

United States Patent Office.

JONATHAN R. HAMILTON, M. D., OF PORTLAND, OREGON.

Letters Patent No. 68,188, dated August 27, 1867.

IMPROVED FUMIGATOR FOR DESTROYING VERMIN.

*The Schedule referred to in these Letters Patent and making part of the same.*

TO ALL WHOM IT MAY CONCERN:

Be it known that I, JONATHAN R. HAMILTON, of Portland, in the county of Multnomah, Oregon, have invented certain new and useful improvements in a Fumigator for Destroying Vermin, such as ticks on sheep, lice on cattle, &c., and insects on plants; and the following is a full, clear, and exact description of the same, reference being had to the accompanying drawings, making a part of this specification.

Figure 1 represents the exterior view of the apparatus.

Figure 2 shows a section through the same with the stopper and air-fixtures detached.

The object of my invention is to destroy vermin on sheep, cattle, and other animals, and also insects on plants, shrubs, and trees; and it consists in an insulated cup or bowl in which to burn tobacco, lobelia, pennyroyal, or other herbs or substances, in combination with a bellows or other apparatus to force the smoke through a conductor to the points where it is needed to be used.

To enable others to make and use my invention, I will describe it more in detail, referring to the drawings, and to the letters marked thereon.

The cup or bowl A may be made of metal or any other suitable material, and of any size or form to suit the purpose. The inside may be coated with calcined plaster, B B, cement, or any substance which is a non-conductor of heat. The bowl A may have a handle, C, secured to it, so that it can be held with ease, and conveniently to insert the pipe D into the wool on sheep or the hair of animals, the extreme point of the pipe D being provided with small holes $e$ to let the smoke or fumes of the burning weed, which may be forced out with a considerable current, penetrate to the skin where the vermin secrete themselves. And also the pipe D may be inserted into the flowers or buds and under the leaves of plants and shrubs, where lice and insects secrete themselves. The cup or bowl A being constructed as above described, it is provided with a stopper, E, so fitted as to be easily taken out to charge and ignite the weed or substance for fumigating. To the centre of the stopper E is a stem, $f$, to which I attach the bellows F, which may be made of India rubber in the form shown in the figures of the drawing, or it may be a spherical hollow ball, or a bellows of any other construction. The bellows or apparatus F for supplying air to the ignited substance and emitting the fumes in puffs from the orifices $e$ $e$, is provided with cone valves $a$ $a$ in valve-chambers $b$ $b$, so that the air is drawn in from the outer end $d$ and forced out into the chamber H and through it, the current always being in one direction, so that the smoke and fumes can all be brought to bear on the objects intended.

The invention as above described has been practically and thoroughly tested, and has proved to be all that can be desired for the purposes specified, and is regarded by wool-growers and stock-raisers, as well as by florists and horticulturists, to be an indispensable article to the healthy condition of plants, shrubs and flowers, as also to calves and other animals, and effectually destroys ticks on sheep, which has hitherto been regarded as a thing almost entirely impossible, the operation being so easy that it can be performed by any one, and continued an indefinite period without fatigue.

Having thus fully described my invention, what I claim as new, and desire to secure by Letters Patent, is—

1. The cup or bowl A, with its insulated chamber H and pipe D, as constructed with stopper E, in combination with the apparatus F, or its equivalent, for operating, substantially as and for the purposes herein specified.

2. I claim the pipe D, as constructed, with the end closed, and side openings $e$ $e$ for the escape of the fumes, when said pipe is connected with a chamber having an inside coating of calcined plaster or other suitable material, as a non-conductor of heat, as described, and for the purposes herein set forth.

J. R. HAMILTON, M. D.

Witnesses:
    H. L. CUTLER,
    S. SAVAGE.